(12) United States Patent
Brock (10) Patent No.: US 11,354,673 B1
(45) Date of Patent: Jun. 7, 2022

(54) DATA SECURITY ENHANCEMENT FOR ONLINE TRANSACTIONS INVOLVING PAYMENT CARD ACCOUNTS

(71) Applicant: Block, Inc., San Francisco, CA (US)

(72) Inventor: Zachary Brock, San Francisco, CA (US)

(73) Assignee: Block, Inc., San Francisco, CA (US)

( * ) Notice: Subject to any disclaimer, the term of this patent is extended or adjusted under 35 U.S.C. 154(b) by 1318 days.

(21) Appl. No.: 14/453,551

(22) Filed: Aug. 6, 2014

(51) Int. Cl.
*G06Q 20/40* (2012.01)

(52) U.S. Cl.
CPC ....... *G06Q 20/409* (2013.01); *G06Q 20/4018* (2013.01)

(58) Field of Classification Search
CPC ...... G06F 3/0608; G06F 3/0655; G06F 12/16; G06F 3/0652; G06F 3/0679; G06F 9/4843; G06Q 20/341; G06Q 30/0242; G06Q 40/08; G06Q 20/35765; G06Q 20/3821; G06Q 20/385; G06Q 20/208; G06Q 40/025; G06Q 20/409; G06Q 20/4018

See application file for complete search history.

(56) References Cited

U.S. PATENT DOCUMENTS

| | | |
|---|---|---|
| 2,666,655 A | 1/1954 | Wolowitz |
| 3,217,643 A | 11/1965 | Crissy et al. |
| 3,601,913 A | 8/1971 | Pollock et al. |
| 5,221,838 A | 6/1993 | Gutman et al. |
| D358,419 S | 5/1995 | Runyan |
| D387,802 S | 12/1997 | Finkelstein et al. |
| D406,861 S | 3/1999 | Leedy, Jr. |
| D438,563 S | 3/2001 | Webb et al. |
| D462,714 S | 9/2002 | Creighton |
| 6,601,049 B1 | 7/2003 | Cooper |
| D486,515 S | 2/2004 | True |

(Continued)

FOREIGN PATENT DOCUMENTS

| | | |
|---|---|---|
| WO | 2007/008686 A2 | 1/2007 |
| WO | 2016/033165 A1 | 3/2016 |
| WO | 2018/063809 A1 | 4/2018 |

OTHER PUBLICATIONS

Notice of Allowance dated May 31, 2018, for U.S. Appl. No. 15/679,968, of Grassadonia, B., et al., filed Aug. 17, 2017.

(Continued)

*Primary Examiner* — Johann Y Choo
(74) *Attorney, Agent, or Firm* — Lee & Hayes, P.C.

(57) ABSTRACT

Payment card information of a consumer is protected during online payment card based transactions by equipping a user device of the consumer with a control that, when activated by the consumer during an online shopping session, causes the user device automatically to request and receive, from a third-party payment processing service (PPS), temporary proxy payment card information, and to populate that information into an online transaction web interface of the merchant. The temporary proxy payment card information is associated in the third-party PPS with a real payment card account of the consumer. When the PPS receives a transaction authorization request from a merchant via a payment card network, the PPS uses the consumer's real payment card information to authorize the transaction. The consumer's real payment card information is never exposed to the merchant.

18 Claims, 9 Drawing Sheets

(56) References Cited

U.S. PATENT DOCUMENTS

| | | | |
|---|---|---|---|
| 6,694,300 | B1 | 2/2004 | Walker et al. |
| D498,788 | S | 11/2004 | Lubking |
| 7,433,499 | B2 | 10/2008 | Kim |
| 7,567,936 | B1* | 7/2009 | Peckover ............... G06Q 20/12 |
| | | | 705/38 |
| 7,593,862 | B2 | 9/2009 | Mankoff |
| 7,693,745 | B1 | 4/2010 | Pomerantz et al. |
| D620,975 | S | 8/2010 | Skelding et al. |
| D622,315 | S | 8/2010 | Skelding et al. |
| D628,236 | S | 11/2010 | Skelding et al. |
| D635,186 | S | 3/2011 | Skelding et al. |
| D643,062 | S | 8/2011 | Skelding et al. |
| D665,851 | S | 8/2012 | Davis |
| 8,577,803 | B2 | 11/2013 | Chatterjee et al. |
| 8,700,905 | B2 | 4/2014 | Guenther |
| 9,152,973 | B2 | 10/2015 | Warner et al. |
| 9,390,145 | B2 | 7/2016 | Weiss et al. |
| D767,024 | S | 9/2016 | O'Shea et al. |
| 9,741,036 | B1 | 8/2017 | Grassadonia et al. |
| 9,805,384 | B2 | 10/2017 | Chauhan |
| 9,836,736 | B1 | 12/2017 | Neale et al. |
| D813,302 | S | 3/2018 | Getachew et al. |
| 10,032,325 | B1 | 7/2018 | Westen et al. |
| 10,157,397 | B2 | 12/2018 | Walz |
| 2002/0046169 | A1* | 4/2002 | Keresman ............... G06Q 20/04 |
| | | | 705/41 |
| 2006/0206425 | A1 | 9/2006 | Sharma |
| 2007/0022303 | A1* | 1/2007 | Awatsu ................... G06F 21/32 |
| | | | 713/186 |
| 2008/0208688 | A1 | 8/2008 | Byerley et al. |
| 2009/0299864 | A1 | 12/2009 | Newbrough |
| 2010/0089998 | A1 | 4/2010 | Sandstrom et al. |
| 2011/0099088 | A1* | 4/2011 | Berrios .................. G06Q 30/06 |
| | | | 705/26.81 |
| 2011/0306368 | A1* | 12/2011 | McCarthy .......... G06Q 30/0241 |
| | | | 455/466 |
| 2012/0259768 | A1* | 10/2012 | Mukherjee ............. G06Q 40/02 |
| | | | 705/39 |
| 2012/0278189 | A1 | 11/2012 | Goldberg et al. |
| 2012/0290449 | A1 | 11/2012 | Mullen et al. |
| 2012/0296818 | A1 | 11/2012 | Nuzzi et al. |
| 2013/0024361 | A1 | 1/2013 | Choudhuri et al. |
| 2013/0024371 | A1 | 1/2013 | Hariramani et al. |
| 2013/0166441 | A1 | 6/2013 | Kobylkin et al. |
| 2013/0254284 | A1* | 9/2013 | Dougherty .............. G06F 21/00 |
| | | | 709/204 |
| 2013/0346314 | A1* | 12/2013 | Mogollon ............... G06Q 20/12 |
| | | | 705/44 |
| 2014/0012701 | A1 | 1/2014 | Wall et al. |
| 2014/0025461 | A1 | 1/2014 | Knowles et al. |
| 2014/0122988 | A1* | 5/2014 | Eigner .................... H04L 67/30 |
| | | | 715/226 |
| 2014/0249904 | A1 | 9/2014 | Nelsen et al. |
| 2014/0249947 | A1 | 9/2014 | Hicks et al. |
| 2015/0134468 | A1 | 5/2015 | Dixon et al. |
| 2015/0170241 | A1* | 6/2015 | Jacobsen ............... G06F 17/243 |
| | | | 705/26.41 |
| 2015/0278801 | A1 | 10/2015 | Friedlander |
| 2015/0371219 | A1 | 12/2015 | Ljujic |
| 2016/0063484 | A1 | 3/2016 | Carpenter et al. |
| 2016/0275169 | A1 | 9/2016 | Liu et al. |
| 2017/0154341 | A1 | 6/2017 | Gilbertson |
| 2017/0372415 | A1 | 12/2017 | He |
| 2018/0005231 | A1 | 1/2018 | Grassadonia et al. |
| 2018/0096340 | A1 | 4/2018 | Omojola et al. |
| 2018/0150823 | A1 | 5/2018 | Omojola et al. |
| 2019/0034889 | A1 | 1/2019 | Brock et al. |
| 2019/0172055 | A1 | 6/2019 | Hale et al. |

OTHER PUBLICATIONS

Non Final office Action dated Jun. 15, 2018, for U.S. Appl. No. 15/721,212, of Omojola, A., et al., filed Sep. 29, 2017.
Non Final office Action dated Jun. 27, 2018, for U.S. Appl. No. 15/965,792, of Jacoby, B , et al., filed Apr. 27, 2018.
Ex Parte Quale Action dated Sep. 19, 2018, for Design U.S. Appl. No. 29/586,095, of Omojola, A., et al., filed Nov. 30, 2016.
Non-Final Office Action dated Nov. 13, 2018, for U.S. Appl. No. 29/586,087, of Omojola, A., et al., filed Nov. 30, 2016.
Final Office Action dated Nov. 15, 2018, for U.S. Appl. No. 15/721,212, of Omojola, A., et al., filed Sep. 29, 2017.
Non-Final Office Action dated Mar. 7, 2019, for Design U.S. Appl. No. 29/586,095, of Omojola, A., at al., filed Nov. 30, 2016.
Non-Final Office Action dated Mar. 22, 2019, for U.S. Appl. No. 16/206,834, of Omojola, A., et al., filed Nov. 30, 2018.
Non-Final Office Action dated Sep. 15, 2016, of U.S. Appl. No. 15/199,457, for Grassadonia, B., el al., filed Jun. 30, 2016.
Notice of Allowance dated Apr. 21, 2017, of U.S. Appl. No. 15/199,457, for Grassadonia, B , et al., filed Jun. 30, 2016.
Non-Final Office Action dated Sep. 20, 2017, for U.S. Appl. No. 15/679,968, of Grassadonia, B., et al., filed Aug. 17, 2017.
Non-Final Office Action dated Dec. 8, 2017, for U.S. Appl. No. 15/382,132, of Westen, P., et al., filed Dec. 16, 2016.
Notice of Allowance dated Jan. 8, 2018, for U.S. Appl. No. 15/679,968, of Grassadonia, B., et al., filed Aug. 17, 2017.
Notice of Allowance dated Mar. 26, 2018, for U.S. Appl. No. 15/382,132, of Westen, P., et al., filed Dec. 16, 2016.
International Search Report and Written Opinion for International Application No. PCT/US2017/051468, dated Nov. 22, 2017.
Non-Final Office Action dated Jun. 27, 2019, for U.S. Appl. No. 15/282,759, of Omojola, A., et al., filed Sep. 30, 2016.
Final Office Action dated Aug. 22, 2019, for Design U.S. Appl. No. 29/586,087, of Omojola, A., et al., filed Nov. 30, 2016.
Final Office Action dated Aug. 22, 2019, for Design U.S. Appl. No. 29/586,095, of Omojola, A., et al., filed Nov. 30, 2016.
Non-Final Office Action dated Aug. 23, 2019, for U.S. Appl. No. 16/206,834, of Omojola, A., et al., filed Nov. 30, 2018.

* cited by examiner

File Edit View Favorites Tools Help https://shoppingcart.acme.com/56EJ7KL12

PPS ← 45

ACME, Inc.

Billing Information

First Name
Last Name
Street Address
Address Line 2
City
State  Select ▼   Zip Code Card Information Card Type       Select ▼
Card Number
Security Code
Expiration Date
Name on Card

— 46

Subtotal: $179.99
Tax     : $ 14.85
Total   : $194.84

Pay Now ← 47

*File Edit View Favorites Tools Help* https://shoppingcart.acme.com/56EJ7KL12

PPS — 45

ACME, Inc.

Billing Information

First Name: Joseph
Last Name: Customer
Street Address: 123 Anywhere St.
Address Line 2:
City: San Francisco
State: CA    Zip Code: 91234

Card Information

Card Type: VISA
Card Number: 41470123456789110
Security Code: 012
Expiration Date: July 2015
Name on Card: Joseph Customer

— 46

Subtotal: $179.99
Tax: $ 14.85
Total: $194.84

Pay Now — 47

DATA SECURITY ENHANCEMENT FOR ONLINE TRANSACTIONS INVOLVING PAYMENT CARD ACCOUNTS

FIELD OF THE INVENTION

At least one embodiment of the present invention pertains to electronic commerce, and more particularly, to a technique for enhancing security of sensitive data during online transactions involving payment card accounts.

BACKGROUND

When purchasing goods or services online (e.g., via the Internet), a consumer may be given the option to pay by credit card or other type of payment card (e.g., debit card or gift card). To do so, after adding one or more items to his or her electronic shopping cart and requesting checkout, the consumer typically enters his or her payment card information into a web page generated by a shopping cart application of the merchant. Once the payment card information is entered, the consumer provides a confirmation input that indicates his or her commitment to the transaction and that causes his or her user device to submit payment information to the website of the merchant. The merchant's computer system then requests authorization of the card transaction through a financial system.

One problem with this payment paradigm is that it exposes sensitive information of the consumer, namely, the consumer's payment card information, to various third parties, where it may be vulnerable to misappropriation. For example, the payment card information may be inadvertently provided by the consumer to a wrongdoer posing as a legitimate online merchant. Additionally, merchants sometimes store the consumer's card information. Different merchants implement vastly differing degrees of data security, such that the consumer's card information may be vulnerable to unauthorized acquisition by hackers once it is in the possession of a merchant.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

In the technique introduced here, credit card or other payment card information of a consumer (also called the "cardholder" or "user" herein) is protected during online payment card based transactions, by enabling a user device of the consumer to request and receive, during an online shopping session, temporary proxy payment card information from a third-party payment processing service (PPS), and by enabling the user device to populate that temporary proxy payment card information into an online transaction web interface of the merchant automatically. In some embodiments, this is accomplished by equipping a browser in the user device with a control that, when activated by the consumer, accesses the PPS to obtain the proxy card information populates that information into the online transaction web interface of the merchant automatically. The temporary proxy payment card information is associated in the third-party PPS with a real payment card account of the consumer. When the merchant requests authorization for the transaction with the proxy payment card information, the authorization request gets routed to the PPS via the payment card network, by virtue of the proxy card number, according to the normal authorization request routing process. The PPS then uses the consumer's real payment card information to authorize and fund the transaction.

Hence, the consumer's real payment card information is never exposed to the merchant or to any unauthorized third parties who penetrate the merchant's information systems. Additionally, this technique is completely transparent to the merchant and therefore requires no modifications to the merchant's e-commerce system.

Consider the following example scenario in which the technique can be applied. The PPS is a secure business enterprise and computer system that is highly trusted by the consumer. A consumer initially enrolls with the PPS by setting up an account with the PPS, which includes providing his or her real credit card information to the PPS. Enrollment with the PPS may be done via a website of the PPS, by telephone, electronic mail, standard mail, or any other convenient communication channel. The consumer further installs a software extension or plug-in associated with the PPS into a conventional web browser (e.g., Microsoft Internet Explorer, Mozilla Firefox or Google Chrome) in a user device used by the consumer. The user device may be, for example, a conventional personal computer (PC), such as a desktop computer or laptop computer, or it may be a smartphone, tablet computer, or any other known or convenient processing device.

The consumer later visits an electronic commerce (e-commerce) website of a merchant, which may be a merchant with whom the consumer is not familiar and in whom the consumer does not have a high level of trust. The consumer adds one or more items to his or her electronic shopping cart and requests checkout. The consumer then clicks a button to activate the PPS browser extension, by which the consumer can pay securely through the PPS. When activated, the extension accesses the PPS (which is implemented at least partially on one or more remote server computers) via a network such as the Internet, to obtain a dynamically generated credit card number, along with corresponding card type information, cardholder name, expiration date and card verification value (CVV); this information collectively is the temporary proxy payment card information (or simply proxy card information). The proxy card information can include a valid Visa or Mastercard number, for example, and may be issued by the PPS. Once received from the PPS, the PPS browser extension automatically populates the proxy card information into the merchant's website's checkout page (e.g., a web form). The PPS is subsequently contacted as the card issuer during the credit card payment authorization process.

Note that while the example of a credit card is used herein to facilitate description, the proxy card information can be associated in the PPS with any other type of real payment card, such as a debit card or a gift card, for example.

The PPS can maintain validity rules that limit the validity of the proxy card information, such as by time, merchant, transaction amount, number of transactions, or any other criteria. These rules may be specified or selected by the consumer (prior to the transaction), or they may be default rules provided by the PPS. The validity rules include at least one validity criterion, which can be or include, for example, a maximum individual or collective transaction amount and/or a maximum number of transactions for which the proxy card information can be used, particular merchant or category of merchant in which the proxy card information can be used, etc. The validity criterion further can be or include an expiration date and/or time for the proxy card information, which can be different from the expiration date of the consumer's real payment card. Furthermore, the expiration date/time of the proxy card information can also be different from the proxy expiration date provided to the merchant website, i.e., it can be earlier than or later than the proxy expiration date. In other words, the proxy card expiration date provided to the merchant may be a dummy expiration date that does not reflect the actual expiration date/time of the proxy card information or the expiration date of the consumer's real payment card information.

For example, the validity rules might specify that the proxy card information can be used only once, or only once per day, or only once per day per merchant, or only for specific merchants or categories of merchants, or only for up to $2,500 per month, or combination of such restrictions. From the merchant's perspective, the consumer is using a normal payment card number (and associated information). From the consumer's perspective, they just enter minimal PPS authentication information (e.g., username and password) once, or at most once per user session. From the PPS's perspective, they receive an authorization request through the proxy card information and then use the consumer's real card information on file to authorize and fund the transaction.

If the merchant is the target of a hacking attack directed to its stored card information, all they have of the consumer is a name and card information that has no value, because the information is single-use or very limited use, and the PPS can deactivate all proxy card numbers used at that merchant without having to the deactivate the backing payment cards.

Figure 1:
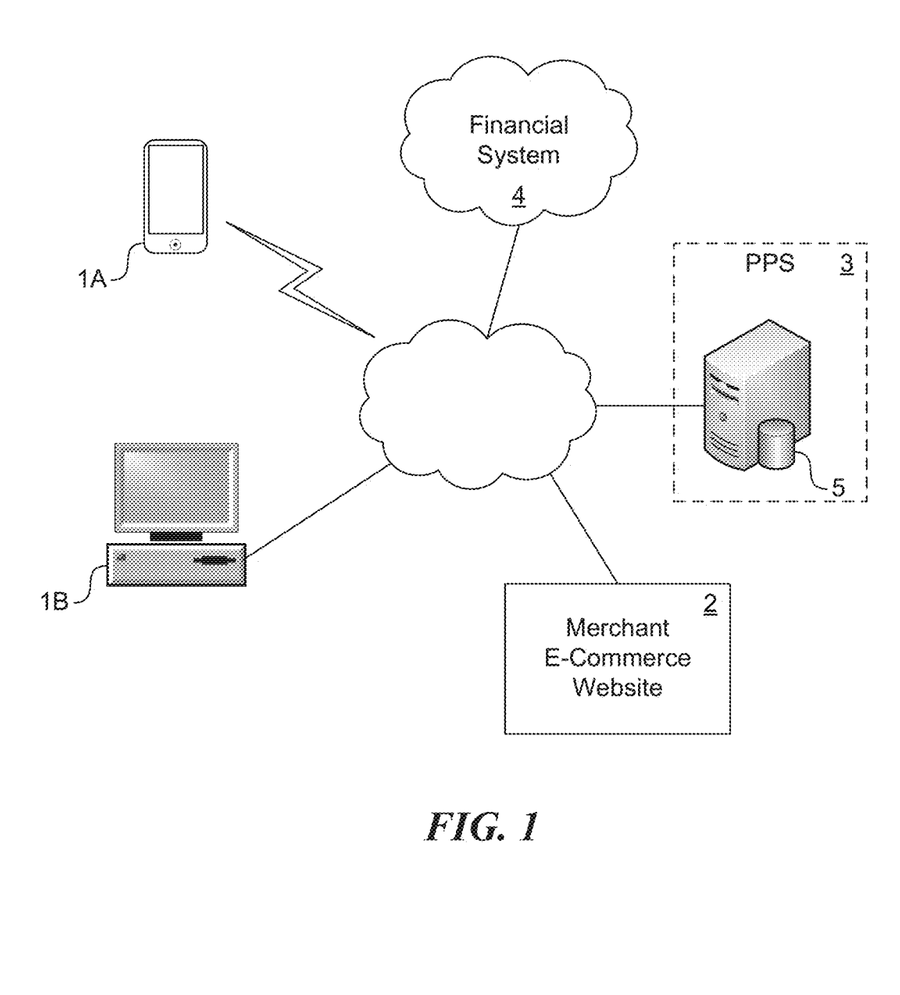
FIG. 1 illustrates an example of an environment in which the data security technique can be implemented.

FIG. 1 illustrates an example of an environment in which the data security technique can be implemented. The environment includes at least one user device 1A or 1B (collectively user device 1) of a consumer, which can be, for example, a mobile device 1A such as a smartphone or tablet, or a PC 1B. The environment further includes an e-commerce website 2 of a merchant, a computer system 3 of the PPS (hereinafter the PPS system 3), and a financial system 4 for processing payment card transactions. The PPS system 3 includes a database 5 storing information such as identification information of users enrolled with the PPS, real payment card account information of such users, and an association of that account information with proxy card information for at least some users.

Though not shown in FIG. 1, the financial system 4 can include the merchant's acquiring bank and at least one payment card payment network, such as Visa or MasterCard, and computer systems associated with such entities. Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 6, which can be or include the Internet and one or more wireless networks (e.g., a WiFi network and/or a cellular telecommunications network).

Figure 2:
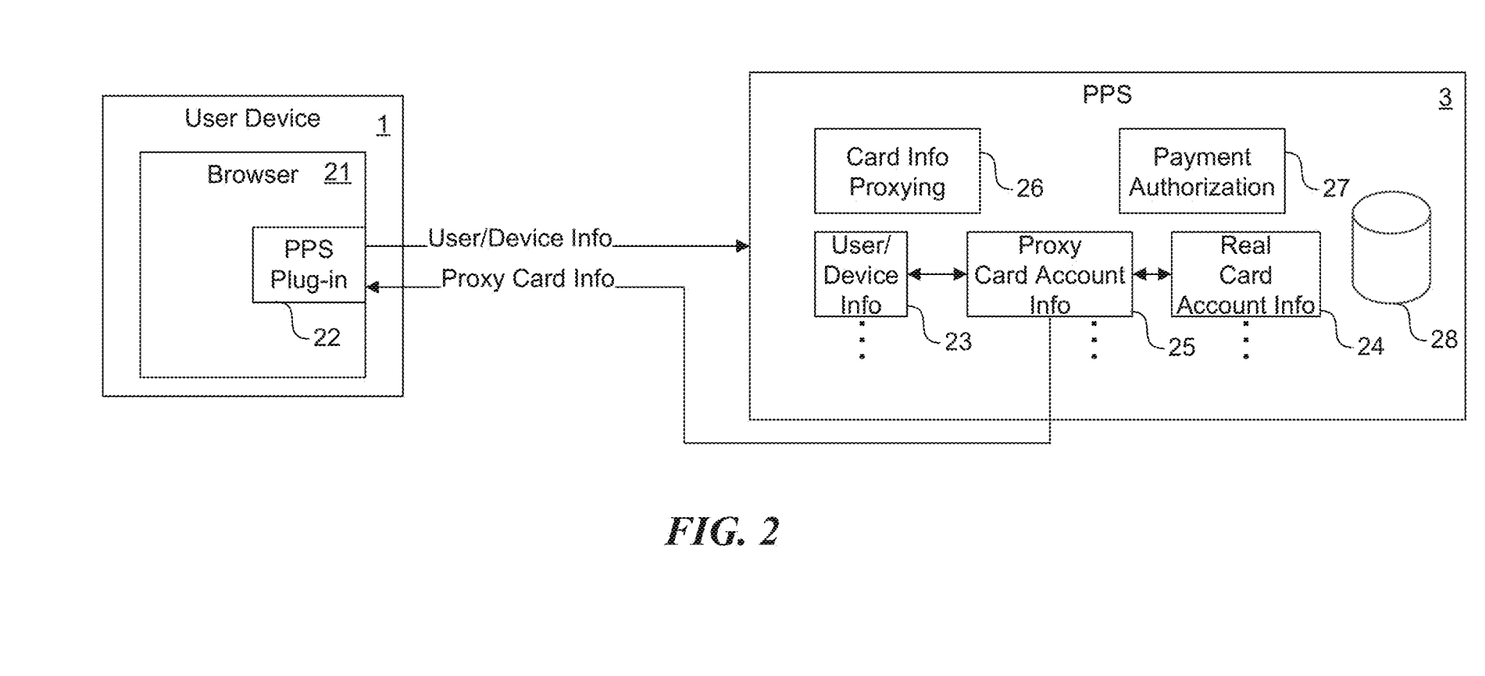
FIG. 2 illustrates relevant elements of the user device and the payment processing service (PPS) system.

Referring now to FIG. 2, the user device 1 and the PPS system 3 are shown in greater detail, according to at least one embodiment. As illustrated, the user device 1 includes a browser 21, which in the illustrated embodiment includes a user-installable extension (plug-in) 22 associated with the PPS. In the case of a mobile user device, the PPS client-side functionality may be implemented, for example, by a bookmarklet (i.e., a browser bookmark containing executable script such as JavaScript).

The PPS system 3 includes, for each consumer enrolled with the PPS, information 23 identifying the consumer and/or the consumer's user device (hereinafter "user/device information"), real payment card account information 24 of the consumer, and proxy payment card information 25 associated with the consumer. Additionally, the PPS system 3 includes a card information proxying unit 26 and a payment authorization unit 27. The card information proxying unit 26 is responsible for maintaining the association between the consumer's user/device information 23, real card account information 24 and proxy card account information 25, and for looking up and providing proxy card account information 25 to the user device 1 when required. The payment authorization unit 27 is responsible for determining whether to authorize requested payment card transactions, including applying stored validity rules 28 associated with the proxy card information 25.

In some embodiments, the PPS system 3 may associate a particular consumer with two or more different sets of proxy payment card accounts, all of which may be associated in the PPS system 3 with the same real payment card of the consumer or with two or more different real payment cards of the consumer. In such an embodiment, the particular proxy payment card information to be used for a given transaction can be selected using any of various techniques, such as by user selection on a per-transaction basis, based on selection rules or policies previously specified by the user, or based on default rules or policies. The real payment card or cards associated with a particular consumer in the PPS system 3 (and hence, with a particular set of proxy payment card information) can include one or more credit cards, debit cards, gift cards, or a combination thereof.

In operation, when the consumer activates a known browser control associated with the PPS plug-in 22, the PPS plug-in 22 sends information of the consumer to the PPS. In certain embodiments, the PPS plug-in first prompts the consumer to enter his or her identifying information to be used by the PPS to authenticate the consumer, such as a username and password. This information can be input one time and then stored locally in the user device for future use, or it may be input by the consumer for each online transaction or each user session. The user/device information may be sent to the PPS system 3 via any known or convenient network or internetwork, such as the Internet. When the user/device information is received by the PPS system 3, the card information proxying unit 26 uses the user/device information to look up the proxy card account information 25, which it then returns to the PPS plug-in 22.

The PPS plug-in 22 then populates the received proxy card account information into the payment information user interface provided by the merchant's website 2, which may be a web form. The receipt of proxy card information and population of that information into the merchant's user interface normally happens within a few seconds (at most), of the consumer activating the PPS browser control. In an alternative embodiment, the proxy card information may simply be displayed to the user, who then manually copies that information into the merchant's payment information user interface.

When the user commits to the transaction by providing an appropriate confirmation input, the merchant e-commerce website 2 sends a transaction authorization request to its acquiring bank, which routes the request to the applicable card network (e.g., Visa or MasterCard) based on the proxy payment card number, which then routes the request to the PPS system 3. The payment authorization unit 27 in the PPS system 3 then uses the proxy payment card number in the request to look up the applicable validity rules or rules 28 associated with the proxy payment card information and determine whether the transaction request complies with them. If the request does not comply with any applicable validity rule(s) 28, the authorization request is denied. If the request does comply, then the payment authorization unit 27 looks up the real payment card information 24 of the consumer and uses that information to authorize the transaction, assuming the consumer's real payment card has not expired and has sufficient credit or funds remaining to cover the transaction amount.

In some embodiments, instead of implementing this technique with a browser extension on the client side, the PPS client-side functionality may be provided by a separate software application or dedicated PPS hardware device that operates in the consumer's user device 1. In that scenario, the PPS can publish an application programming interface (API) for other software vendors, to allow browsers and/or e-commerce software to invoke the PPS functionality. In that case, the user can easily switch back and forth between a browser or e-commerce application and the PPS client-side application/functionality, to request and receive proxy payment card information.

Figure 3:
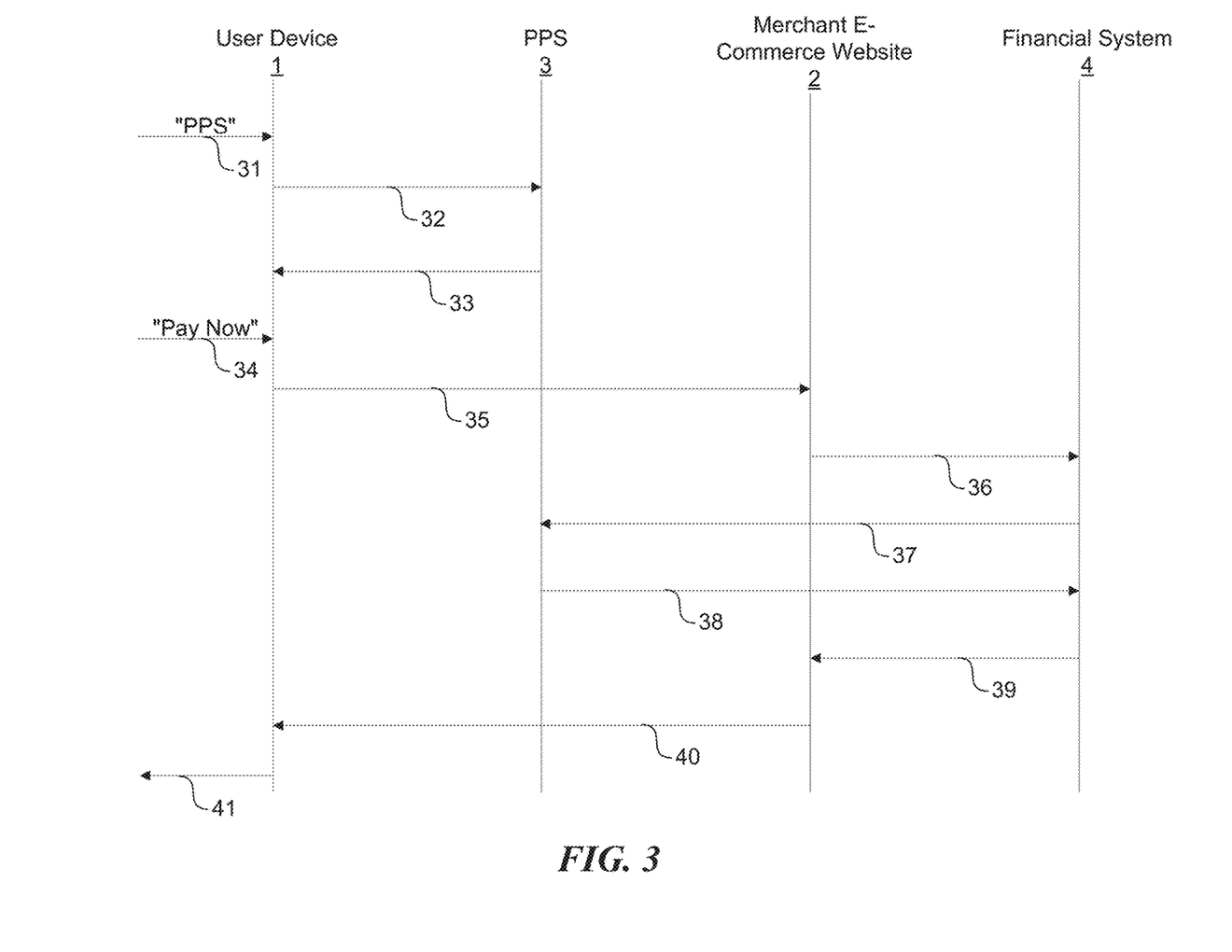
FIG. 3 illustrates an example of the message flow between various elements associated with the data security technique.
Figure 4A:
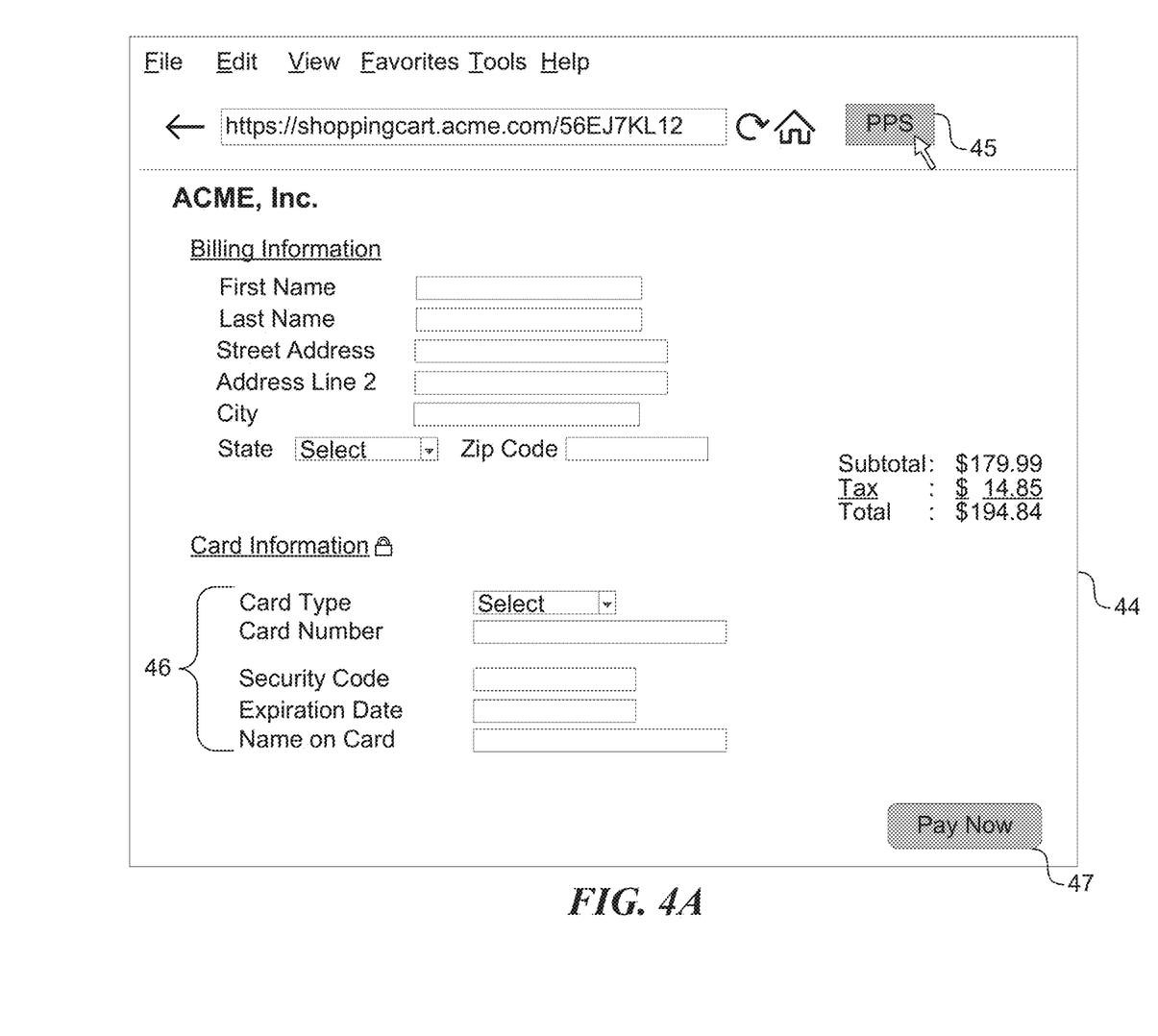
FIGS. 4A and 4B illustrate unpopulated and populated states, respectively, of a merchant's payment information webpage.

FIG. 3 illustrates an example of the message flow between various elements associated with this technique, according to some embodiments. When the consumer is requested by a merchant's e-commerce website to enter payment information for a transaction, the consumer enters an appropriate user input 31 associated with PPS functionality, to the user device 1. FIG. 4A shows an example of a merchant's initially empty payment information webpage 44 (e.g., an HTML form or the like). The above-mentioned user input 31 can be in the form of the consumer clicking on a "PPS" button 45 or other similar control, displayed (e.g., by the PPS plug-in) on the webpage 44.

In response to user input 31, the user device 1 sends a proxy card information request 32 to the PPS system 3. The request may be sent using any known or convenient protocol(s), including, for example, Hypertext Transport Protocol Secure (HTTPS).

Note that in this description, any references to sending or transmitting a message, signal, etc. to another device (recipient device) means that the message is sent with the intention that it its information content ultimately be delivered to the recipient device; however, such references do not mean that the message must be sent directly to the recipient device. That is, unless stated otherwise, there can be one or more intermediary entities that receive and forward the message, signal, etc., either as is or in modified form, prior to its delivery to the recipient device. This clarification also applies to any references herein to receiving a message, signal, etc. from another device; i.e., direct point-to-point communication is not required unless so stated.

Figure 4B:
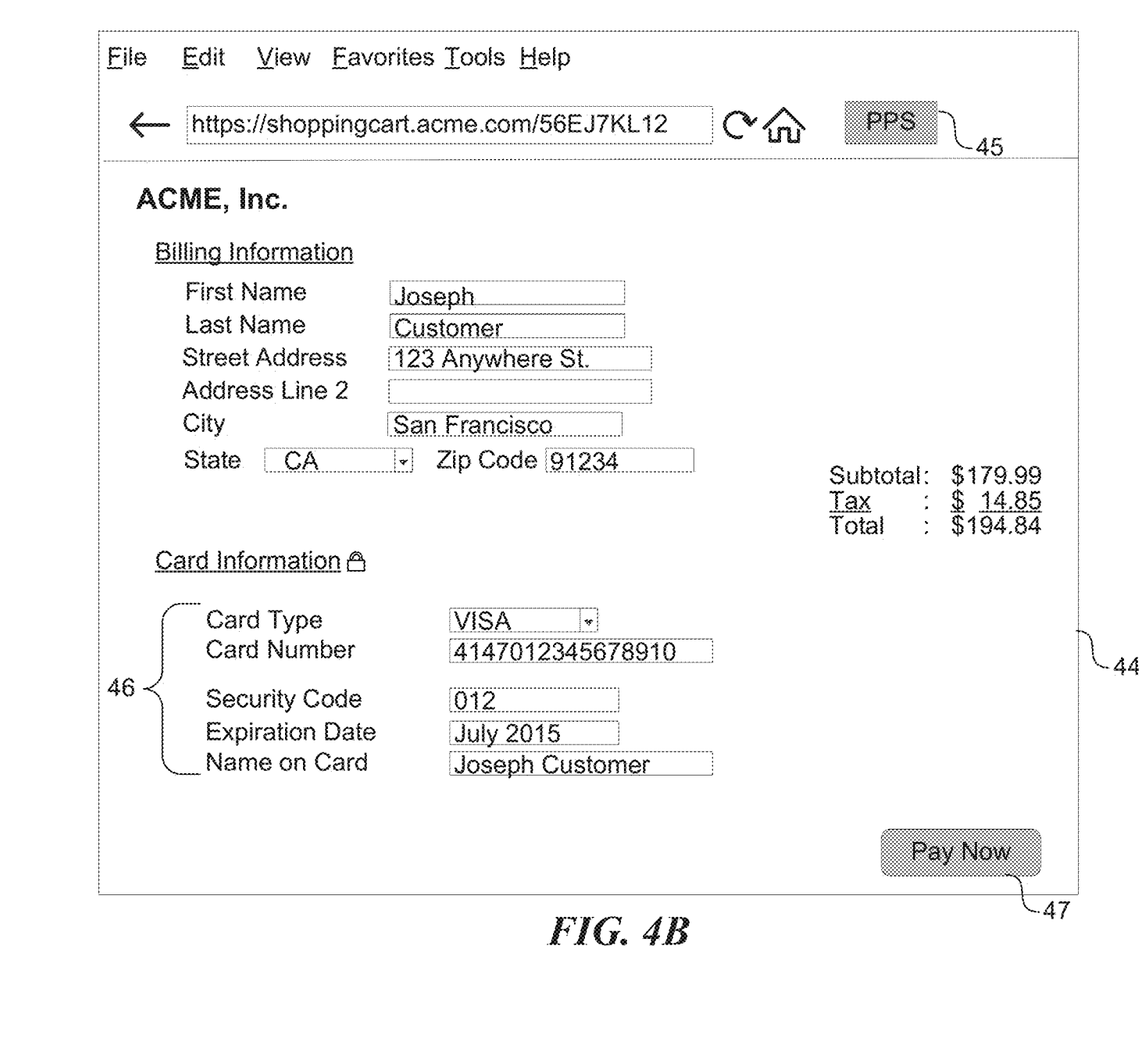

In response to the proxy card information request 32, the PPS system 3 generates or looks up the proxy payment card information for that user, and returns it to the user device in a proxy card information response 33. The PPS functionality in the user device 1 then automatically populates this information into the payment card information fields 46 (e.g., card type, card number, security code (CVV), expiration date and name on card) in the merchant's payment information webpage 44. Alternatively, the consumer can manually copy that information into the merchant's payment information webpage 44. An example of the result of this operation is shown in FIG. 4B, which shows the webpage 44 of FIG. 4A after the card information fields 46 have been populated.

In certain embodiments, to provide additional fraud protection, the PPS system 3 can use a different proxy payment card number for each merchant or category of merchants. Additionally, or as an alternative, the PPS system 3 can generate different combinations of proxy CVVs and/or proxy expirations dates with the same proxy payment card number, and can use a different combination of such information for each merchant or category of merchant. The use of such combinations provides a greater number of unique permutations of proxy payment card information, thereby reducing the overall exposure to wrongdoers.

When the consumer is ready to commit to the transaction, he or she enters an appropriate user input 34 to the user device 1, for example, by clicking on a "Pay Now" button 47. This causes the user device 1 to send a conventional transaction confirmation message 35 (e.g., using HTTPS or other similar protocol) containing the proxy card information to the merchant's e-commerce website 2. The merchant's e-commerce website 2 then sends a transaction authorization request 36 to the financial system 4. The financial system 4 routes the request in the form of message 37 to the PPS system 3. The PPS system 3 determines whether to authorize the transaction in the manner described above, and sends an authorization response 38 (e.g. authorized or declined) to the financial system 4, which forwards the response in the form of message 39 to the merchant's e-commerce website 2. The merchant's e-commerce website 2 then sends an appropriate message 40 confirming or denying the transaction to the user device 1, which displays 41 the message to the consumer.

Figure 5:
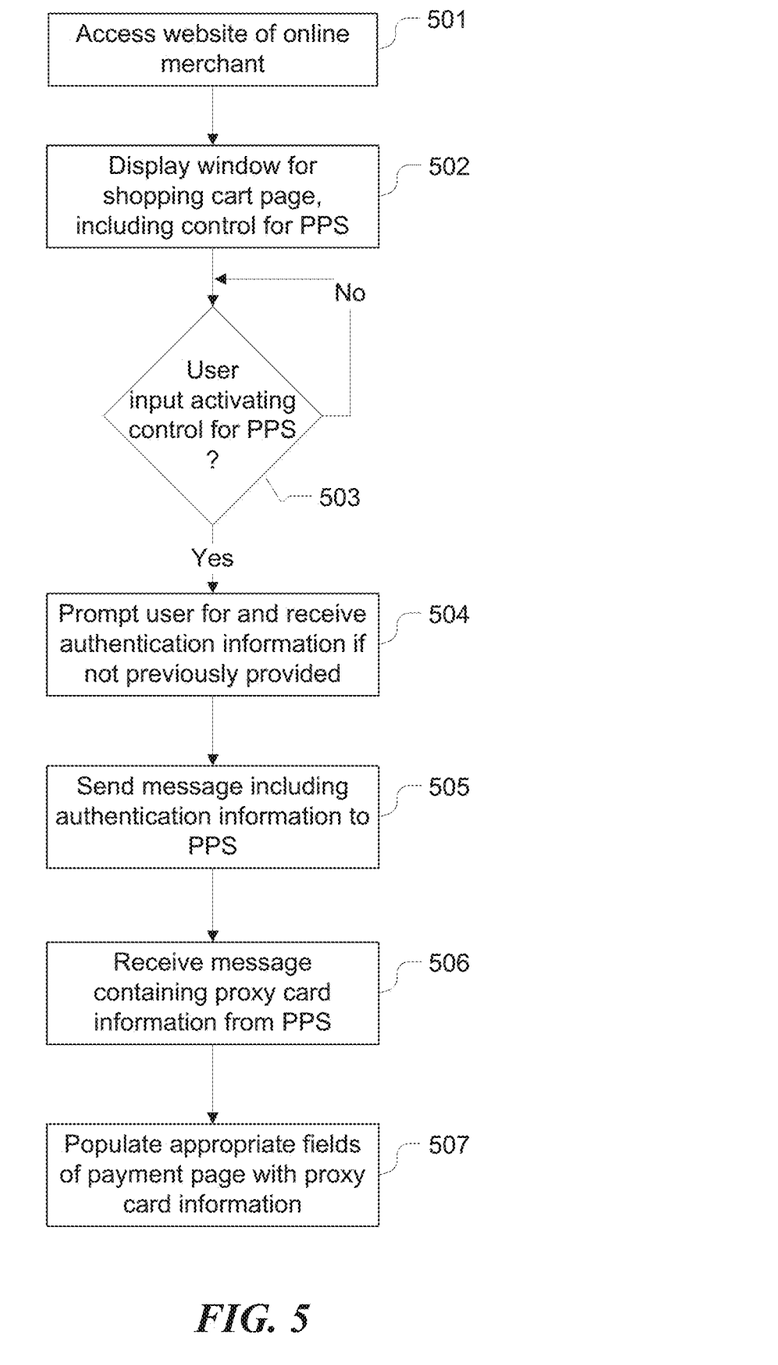
FIG. 5 illustrates an example of the process performed by the consumer's user device in the data security technique.

FIG. 5 illustrates an example of a process performed by the consumer's user device 1, according to some embodiments. Initially, in response to a user input, a browser in the user device accesses the website of an online merchant at step 501. At step 502 the browser displays a window including a shopping cart page of the merchant, where the window includes a control for the PPS (e.g., "PPS" button 45). When the consumer activates the PPS control at step 503 (after having added one or more items to his or her shopping cart and requested checkout), the PPS functionality in the user device 1 then at step 504 prompts the consumer for and receives PPS authentication information (e.g., username and password), if such information was not previously input by the consumer and stored locally in the user device. Next, at step 505 the user device 1 sends a message including the consumer's authentication information to the PPS system 3. Assuming the user is properly authenticated by the PPS system 3, the user device 1 receives a message containing the proxy card information from the PPS system 3 at step 506. The user device 1 then at step 507 appropriately populates the payment card information fields of the merchant's payment information page with the proxy card information.

Figure 6A:
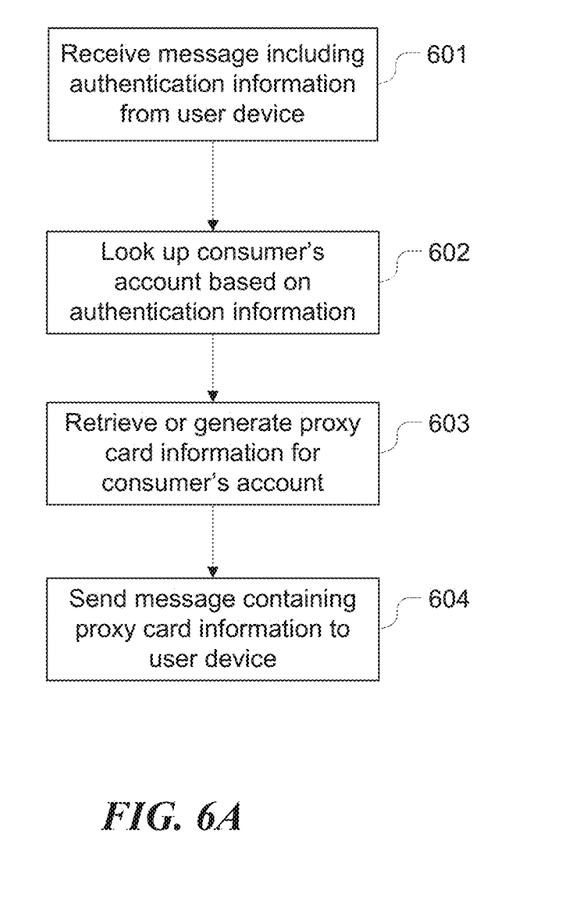
FIGS. 6A and 6B illustrate examples of processes performed by the PPS system in the data security technique.
Figure 6B:
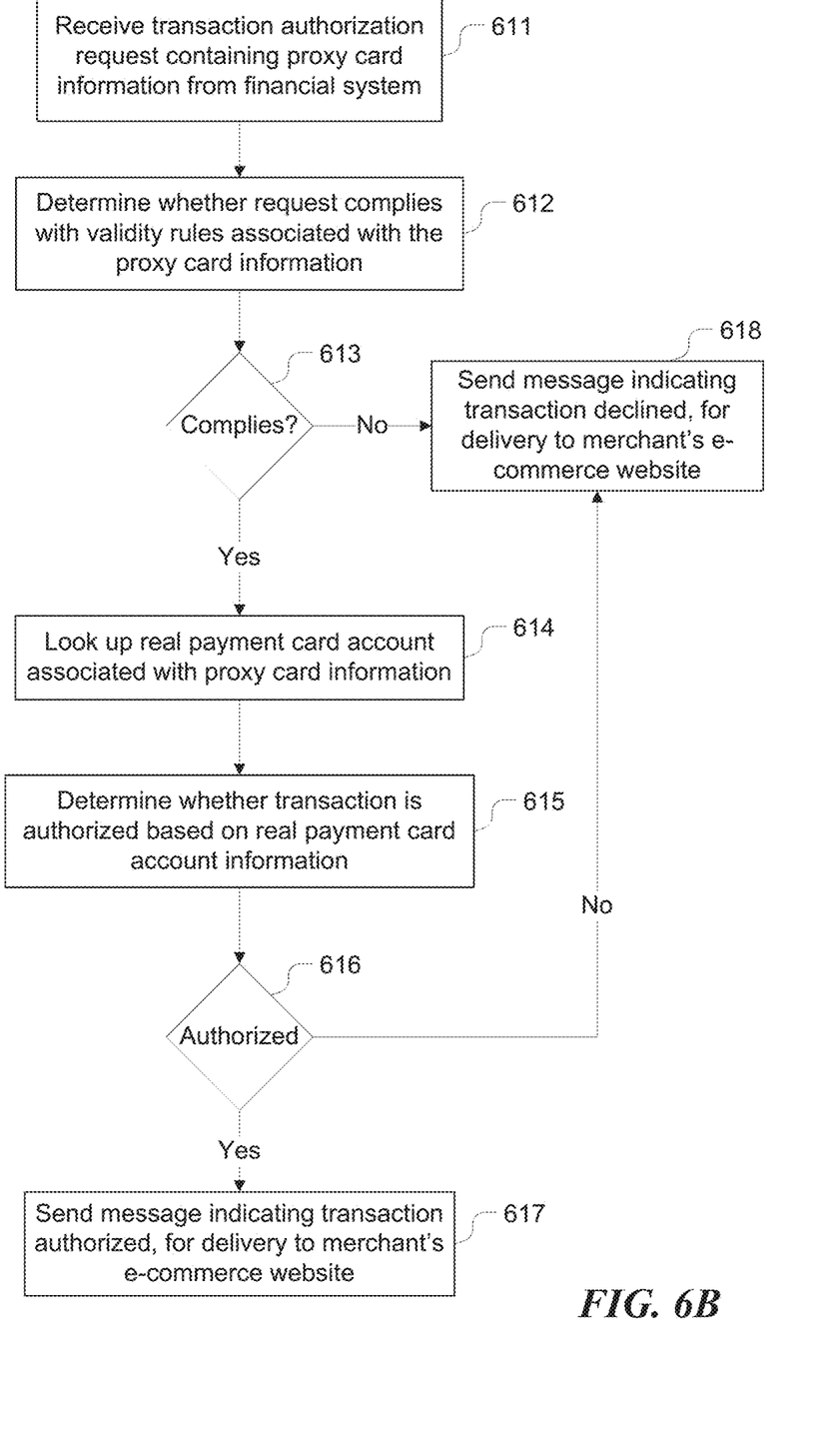

FIGS. 6A and 6B illustrate examples of processes performed by the PPS system 3, in association with the example of FIG. 5, according to some embodiments. More specifically, FIG. 6A shows an example of the process for providing proxy card information to the user device 1. Initially, at step 601 the PPS system 3 receives a message including the consumer's authentication information from the user device 1. The PPS system 3 responds by looking up the consumer's account information based on the authentication information at step 602. Based on the account information, the PPS system 3 at step 603 retrieves the proxy card information associated with consumer's account if that information was previously generated and stored in the PPS system 3, or generates the proxy card information if it was not previously generated and stored. The PPS system 3 then sends a message containing the proxy card information to the user device at step 604.

FIG. 6B shows an example of the process by which the PPS system 3 processes a subsequent transaction authorization request. At step 611 the PPS system 3 receives a transaction authorization request containing proxy card information, from the financial system 4, based on a corresponding authorization request originated by the merchant's e-commerce website 2. At step 612 the PPS system 3 responds to the authorization request by determining whether the request complies with the validity rule or rules, stored in the PPS system 3, associated with the proxy card information in the request. As described above, the rules include one or more of validity criteria for the proxy card information, such as a time limit, merchant identity or category restriction, transaction amount limit, etc., or a combination thereof. If the request does not comply with all applicable validity rules (step 613), then the PPS system 3 at step 618 sends a message for delivery to the merchant's e-commerce website 2, indicating that the transaction is denied. If, on the other hand, the request complies with all applicable validity rules (step 613), the PPS system 3 at step 614 looks up the real payment card account associated with the proxy card information, and then determines at step 615 whether the transaction can be authorized based on the real payment card account information (e.g., whether the real payment card is not expired and has sufficient credit or funds available to cover the transaction amount). If the PPS system 3 determines that the transaction can be authorized based on the real payment card account information (step 616), the PPS system 3 sends a message at step 617 for delivery to the merchant's e-commerce website, indicating that the transaction is authorized; otherwise, the process branches to step 618, where the PPS system 3 sends a message for delivery to the merchant's e-commerce website 2, indicating that the transaction is denied.

Figure 7:
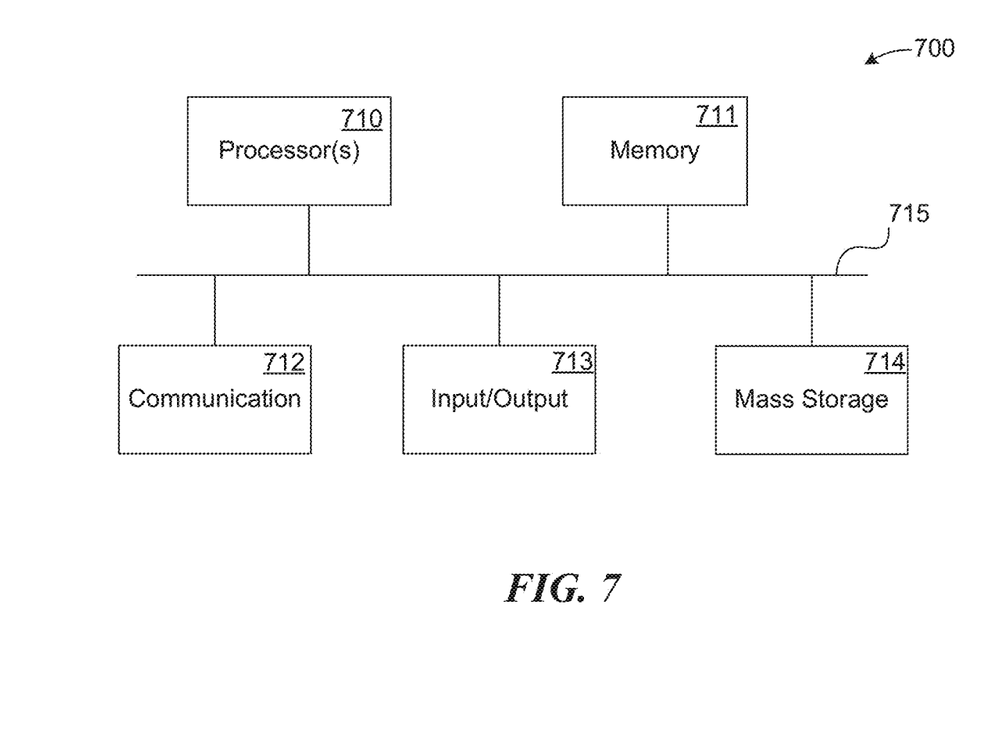
FIG. 7 illustrates an example of the hardware architecture of a processing system that can be used to implement any of the computing devices referred to herein.

FIG. 7 illustrates at a high-level an example of the hardware architecture of a processing system that can be used to implement any of the computing devices referred to above, such as the user device 1, the merchant website 2, the PPS system 3, or the financial system 4. Note that any of these devices each can include multiple instances of an architecture such as shown in FIG. 7 (i.e., multiple computers), particularly the server-based systems such as the merchant website 2, PPS system 3, and financial system 4, and such multiple instances can be coupled to each other via a network or multiple networks.

In the illustrated embodiment, the architecture 700 includes one or more processors 710, memory 711, one or more communication device(s) 712, one or more input/output (I/O) devices 713, and one or more mass storage devices 714, all coupled to each other through an interconnect 715. The interconnect 715 may be or include one or more conductive traces, buses, point-to-point connections, controllers, adapters and/or other conventional connection devices. The processor(s) 710 may be or include, for example, one or more general-purpose programmable microprocessors, digital signal processors (DSPs), microcontrollers, application specific integrated circuits (ASICs), programmable gate arrays, or the like, or a combination of such devices. The processor(s) 710 control the overall operation of the processing device 700.

Memory 711 may be or include one or more physical storage devices, which may be in the form of random access memory (RAM), read-only memory (ROM) (which may be erasable and programmable), flash memory, miniature hard disk drive, or other suitable type of storage device, or a combination of such devices. The mass storage device (s) 714 may be or include one or more hard drives, digital versatile disks (DVDs), flash memories, or the like. Memory 711 and/or mass storage 714 may store (individually or collectively) data and instructions that configure the processor(s) 710 to execute operations in accordance with the techniques described above. The communication devices 712 may be or include, for example, an Ethernet adapter, cable modem, Wi-Fi adapter, cellular transceiver, Bluetooth or Bluetooth Low Energy (BLE) transceiver, or the like, or a combination thereof. Depending on the specific nature and purpose of the processing device 700, the I/O devices 713 can include devices such as a display (which may be a touch screen display), audio speaker, keyboard, mouse or other pointing device, microphone, camera, etc. Note that these I/O devices may be unnecessary, however, if the processing device 700 is embodied solely as a server computer.

In the case of the user device 1, the communication devices 712 can be or include, for example, a cellular telecommunications transceiver (e.g., 3G or 4G/LTE), Wi-Fi transceiver, Bluetooth or BLE transceiver, or the like, or a combination thereof. In the case of the validation system 22, the communication devices 712 can be or include, for example, any of the aforementioned types of communication devices, a wired Ethernet adapter, cable modem, DSL modem, or the like, or a combination of such devices.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software used to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of enhancing data security associated with online payment card based transactions, the method comprising:
    accessing, by a browser in a user device of a consumer, a website of an online merchant;
    displaying, on the user device, a shopping cart webpage of the online merchant, the shopping cart webpage including information about a potential transaction between the consumer and the online merchant, the shopping cart webpage further including a plurality of payment card information fields to be populated to enable a request for authorization for the transaction;
    causing display, by the user device, of a control associated with a third-party payment processing service (PPS) that determines whether to approve transactions of the consumer, the third-party PPS being remote from the user device, wherein the control is displayed integrally with a display window of the browser;
    receiving, at the user device, a user input directed to the control associated with the third-party PPS, after displaying the shopping cart webpage and prior to a confirmation of the transaction by the user; and
    in response to the user input directed to the control, and without requiring any further input from the consumer,
        (i) automatically sending, from the user device of the consumer, a first electronic message to a remote computer system of the third-party PPS, the first electronic message including an identifier of the consumer or of the user device of the consumer, the identifier being previously associated by the third-party PPS with a real payment card account of the consumer,
        (ii) generating, by a card information proxying unit of the remote computer system of the third-party PPS, in response to the first electronic message, (a) a set of proxy payment card information including a proxy payment card number, a proxy card verification value (CVV) and a proxy expiration date, wherein the proxy payment card number, proxy CVV and proxy expiration date are associated in the third-party PPS with the real payment card of the consumer, and wherein the proxy payment card number, proxy CVV and proxy expiration date in combination are associated, in the third-party PPS, with a validity criterion other than a card number, CVV or expiration date of the real payment card of the consumer and (b) instructions for populating the plurality of payment card information fields in the shopping cart webpage based on the generated set of proxy payment card information,
        (iii) receiving, at the user device, from the card information proxying unit of the third-party PPS, the generated set of proxy payment card information and instructions, and
        (iv) automatically populating, at the user device, the plurality of payment card information fields in the shopping cart webpage with the proxy payment card number, proxy CVV and proxy expiration date, in accordance with the instructions received from the third-party PPS.

2. A method as recited in claim 1, wherein the validity criterion has been specified by the cardholder prior to said accessing the website.

3. A method as recited in claim 1, wherein the validity criterion comprises at least one of:
    a maximum individual or collective transaction amount; or
    a maximum number of transactions.

4. A method as recited in claim 1, wherein the validity criterion comprises at least one of:
    a maximum individual or collective transaction amount for a specified time period; or
    a maximum individual or collective transaction amount for a specified merchant.

5. A method as recited in claim 1, wherein the validity criterion comprises an expiration criterion other than the proxy expiration date.

6. A method comprising:
    accessing, by a user device operated by a consumer, an electronic commerce interface of a merchant;
    receiving, by the user device, a predefined user input from the consumer after an initiation, by the consumer, of a transaction between the consumer and the merchant, wherein the predefined user input is received from a control associated with a third-party payment processing service (PPS) that determines whether to approve transactions of the consumer; and
    in response to the predefined user input from the consumer, and without requiring any further user input, causing the user device to
        (i) automatically request, via a network, a set of proxy payment card information from a card information proxying unit of a computer system of the third-party PPS, the third-party PPS being remote from the user device, the set of proxy payment card information being associated in the computer system of the third-party PPS with a real payment card of the consumer and includes information to permit processing of the transaction between the consumer and the merchant,
        (ii) receive, from the card information proxying unit of the computer system of the third-party PPS, (a) the proxy payment card information and (b) instructions for presenting the proxy payment card information on a user interface based on the proxy payment card information, and
        (iii) present, in accordance with the received instructions, the proxy payment card information on a user interface associated with the electronic commerce interface of the merchant, on the user device, prior to a confirmation by the consumer of the transaction between the consumer and the merchant.

7. A method as recited in claim 6, wherein the set of proxy payment card information comprises a proxy payment card number and a proxy expiration date.

8. A method as recited in claim 7, wherein the set of proxy payment card information is associated, in the computer system of the third-party PPS, with a validity criterion other than a card number, CVV or expiration date of the real payment card.

9. A method as recited in claim 8, wherein the validity criterion has been specified by the cardholder prior to said accessing the electronic commerce interface of the merchant.

10. A method as recited in claim 8, wherein the validity criterion comprises at least one of:
- a maximum individual or collective transaction amount; or
- a maximum number of transactions.

11. A method as recited in claim 8, wherein the validity criterion comprises at least one of:
- a maximum individual or collective transaction amount for a specified time period; or
- a maximum individual or collective transaction amount for a specified merchant.

12. A method as recited in claim 6, wherein the validity criterion comprises an expiration criterion other than the proxy expiration date.

13. A method as recited in claim 6, wherein the predefined user input comprises activation of the control from a third-party add-on feature of a browser in the user device, and wherein causing the user device to request and receive proxy payment card information is performed by said add-on feature.

14. A method as recited in claim 6 wherein said accessing the electronic commerce user interface of the merchant is performed by a browser in the user device, and wherein causing the user device to request and receive proxy payment card information is performed by an application in the user device other than the browser.

15. A method as recited in claim 1, wherein the generating the set of proxy payment card information includes selecting, by the card information proxying unit, the set of proxy payment card information from at least two different sets of proxy payment card information associated with the real payment card of the consumer in the third-party PPS, wherein each different set of proxy payment card information includes a different proxy payment card number, a proxy CVV and a proxy expiration date.

16. A method as recited in claim 15, wherein the selecting the set of proxy payment card information from at least two different sets of proxy payment card information is based on a predetermined criteria associated with the online merchant.

17. A method as recited in claim 1, wherein the generating the set of proxy payment card information includes dynamically generating a payment card number, a proxy CVV and a proxy expiration date by the card information proxying unit.

18. A method as recited in claim 1, wherein the generating the set of proxy payment card information includes selecting, by the card information proxying unit, the set of proxy payment card information from at least two different sets of proxy payment card information associated with one or more real payment cards of the consumer in the third-party PPS, wherein each different set of proxy payment card information includes at least one of a different proxy payment card number, a different proxy CVV or a different proxy expiration date.

* * * * *